March 14, 1939. W. F. ERRIG 2,150,650

TIRE RIM

Filed Jan. 13, 1937

INVENTOR.
William F. Errig
F. Bascom Smith
ATTORNEY.

Patented Mar. 14, 1939

2,150,650

UNITED STATES PATENT OFFICE 2,150,650

TIRE RIM

William F. Errig, Philadelphia, Pa., assignor to Peco Manufacturing Corporation, Philadelphia, Pa., a corporation of Pennsylvania Application January 13, 1937, Serial No. 120,368

6 Claims. (Cl. 154—9)

This invention relates to means for mounting tires and more particularly to a rim constituted by detachable sections and adapted for supporting pneumatic tires for treatment and use on vehicles, such as on automobiles.

With tire rims which are in use today for supporting tires to be mounted on vehicle wheels, it is extremely difficult, even when using tools designed especially for the purpose, to mount a tire on and remove it from the rim for the purpose of making repairs or the like. Because of this difficulty, considerable time and energy are wasted, tires and tubes are scuffed or otherwise damaged by the tools required, and very often the tube is folded and pinched or otherwise improperly placed within the casing of the mounted tire. It is accordingly highly desirable to provide a strong durable rim on which a tire and tube may be readily and quickly mounted and demounted without the necessity for using tools in contact with the tire casing or tube.

Recent developments in the art of treating tires, i. e., such treatment as the cutting of incisions in the surfaces thereof to render the same non-skid and the retreading of the same in vulcanizing apparatus, have rendered the provision of such a rim even more desirable and practical. This is particularly true in view of the facts that a large percentage of the tires in use on automobiles today are mounted directly on the wheel and that the most satisfactory types, if not all, of the retreading apparatus now in use are not adapted to receive a tire which is so mounted. Various attempts have been made heretofore to provide a rim of the character comprehended by the present invention and for the purpose of overcoming the above difficulties, but none of the rims heretofore provided have proven entirely satisfactory.

It is accordingly one of the objects of the present invention to provide a rim which is suitable for supporting an inflated pneumatic tire and which is so constructed that the tire may be mounted thereon and removed therefrom with utmost facility.

Another object is to provide a tire rim comprising a plurality of continuous, annular members adapted to be detachably secured together in a novel manner.

A further object is to provide novel means for securing operable sections of a tire rim to each other.

Still another object is to provide a rim for pneumatic tires which is constituted by separable parts that may be readily and inexpensively manufactured and which are strong and durable, the means for securing said parts together being such as to obviate any danger of the latter becoming separated in use.

The above and further objects and novel features of the present invention will more fully appear from the following detailed description, when the same is read in connection with the accompanying drawing. It is to be expressly understood, however, that the drawing is for the purpose of illustration only and is not intended as a definition of the limits of the invention, reference being primarily had for this latter purpose to the appended claims.

In the drawing, wherein like reference characters refer to like parts throughout the several views, Fig. 1 is a side elevation of one form of rim comprehended by the present invention;

Figure 1:
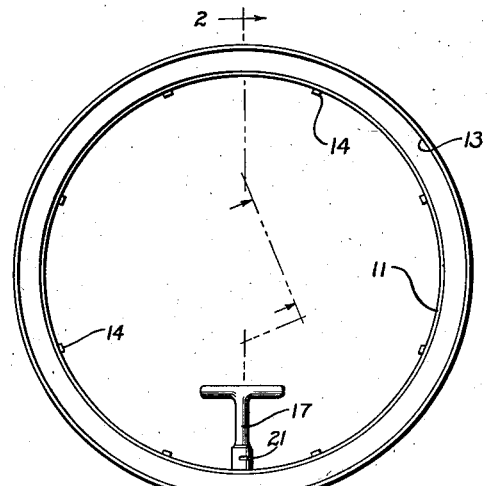
Figure 3:
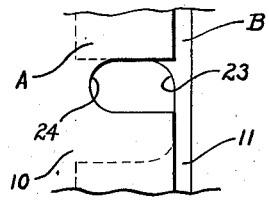
Fig. 3 is a top plan detail view of the rim as seen in Fig. 2 showing the slots for accommodating the valve stem of a tire.

The single embodiment of the invention illustrated, by way of example, is designed primarily for use in mounting tires for treatment, such as for retreading the same or for cutting incisions in the surfaces thereof to render the same non-skid, but the invention may be readily adapted to rims which are intended to be demountably secured on vehicle wheels, as will more fully appear hereinafter. As shown, the novel rim comprehended includes a pair of endless, annular rim members A and B constituted by base portions 10 and 11 which form the central portion of the rim and outwardly extending annular flanges 12 and 13, respectively. The diameter of base portion 11 is reduced adjacent the edge thereof and entirely around its periphery a sufficient amount to permit the rim members A and B to be moved axially into overlapping or telescopic relation and thus form a channel-shaped, annular rim adapted to receive and support a conventional tire casing and tube (not shown) in the usual well-known manner. It will be noted that the surfaces of base portions 10 and 11, which are to be engaged by the tire and tube, are in the same plane and accordingly form in substance a continuous, annular surface.

Novel means are provided in combination with rim members A and B whereby the same may be readily and quickly secured to and detached from one another, either with or without a tire extending between flanges 12 and 13. In the form shown, said means includes a plurality of cylindrical pins or studs 14 rigidly secured to the inner periphery of rim member A adjacent the edge of base portion 10, eight of said studs being shown spaced at equal intervals. An equal number of slots 15 are cut in the reduced base portion 11 of rim member B for receiving said studs, said slots being of substantially uniform width throughout their lengths, said width being only slightly greater than the diameter of studs 14.

Slots 15 are cut with a novel contour whereby the same cooperate with pins 14 to form bayonet joint connections which hold the overlapping rim sections A and B against relative axial and circumferential movement. In the illustrated embodiment, each slot or groove 15 is constituted by a straight, axially extending portion 15a and a curved or arcuate portion 15b extending circumferentially of rim member B. Said curved portion of slot 15 has such a radius of curvature and length as to form a lip 16 at the inner juncture of the two portions 15a and 15b of said slot. Thus, when members A and B are moved axially into telescopic relation with each other, the studs 14 entering slots 15, and are then moved circumferentially relative to one another by novel means to be hereinafter described until said studs engage the inner ends of said slots, the rim members will be held together axially and lips 16 will cooperate with said studs to assist in preventing relative rotational movement of said members.

Novel simplified means are provided for shifting one of the members A or B relative to the other in a circumferential direction to thereby move pins 14 in the curved portions 15b of slots 15 and, hence, into or out of locked position, said means serving also to hold the rim members in said locked position during use. In the embodiment shown, said novel means are constituted by a handle 17 having an axial counter-bore or recess in the enlarged lower end or shank thereof for slidably receiving a cylindrical pin or post 18 which is rigidly secured to and extends radially of base portion 10 of rim member A. At the lower or inner end of handle 17 there is provided a circular flange 19 forming eccentrically with respect to the axis of rotation of said handle and constituting cam means. Eccentric or cam 19 is adapted to extend into and engage the walls of a substantially semi-circular slot or groove 20 (Fig. 4) cut in the reduced base portion 11 of rim member B. Accordingly, when members A and B are in overlapped position and handle 17 is rotated through 180°, counter-clockwise as viewed in Fig. 4, for example, member B will be moved circumferentially relative to member A, the extent of the relative movement being dependent upon the size of cam 19 and its position relative to the axis of rotation of handle 17.

Figure 4:
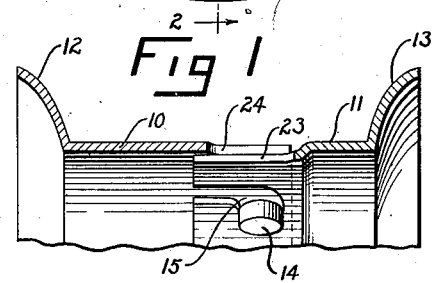
Fig. 4 is a detail view, partly in section and with parts broken away, the section being taken on line 4—4 of Fig. 2.
Figure 4:
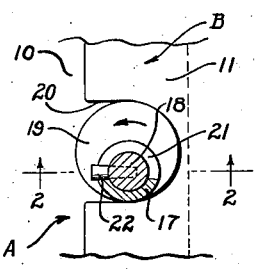

When members A and B are in assembled or locked position, that is, with cam 19 in the position shown in Fig. 4, it will be seen that said cam is effective to hold said members against axial movement toward one another and, hence, effective to maintain lips 16 in position to cooperate with studs 14 for assisting said cam in holding the rim members against relative rotational movement, thereby relieving said cam of some of the strain which would otherwise be impressed thereon. As the cam is rotated in a counter-clockwise direction (Fig. 4), members A and B are freed to move both circumferentially and axially toward each other to thereby permit studs 14 to move freely around lips 16 during such relative circumferential movement of the rim members. After 90° of rotation, cam 19 begins to simultaneously move member B circumferentially with respect to and axially away from member A, thereby positively moving studs 14 in the arc of portions 15b of slots 15. Said studs are thus caused to move freely toward the outer open ends of said slots without binding against the walls thereof at any point. The novel contour of slots 15 is accordingly also effective to enhance the ease with which parts A and B may be assembled and disassembled.

Preferably, means are provided whereby the angular movement of cam 19 is limited to 180°, said means, in the form illustrated, comprising a circumferential slot 21 in the shank of handle 17. A pin 22 is secured to post 18 and slidably extends into said slot, the latter being of such length as to limit the handle to the desired angular movement. Stop pin 22 also serves to secure handle 17 against removal from post 18.

Registering grooves 23 and 24 are provided in the adjacent edges of base portions 10 and 11, respectively, for the purpose of accommodating the valve stem provided on all automobile tire inner tubes. Groove 24 is of substantially the same width as the diameter of the valve stem whereas groove 23 is considerably wider in a circumferential direction in order to permit rim member B to move circumferentially with respect to said stem and rim member A.

Figure 2:
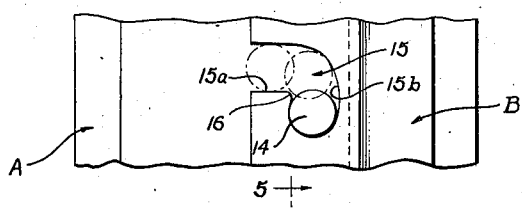
Fig. 2 is a cross sectional view of said rim with parts broken away, the section being taken substantially on lines 2—2 of Figs. 1 and 4.
Figure 2:
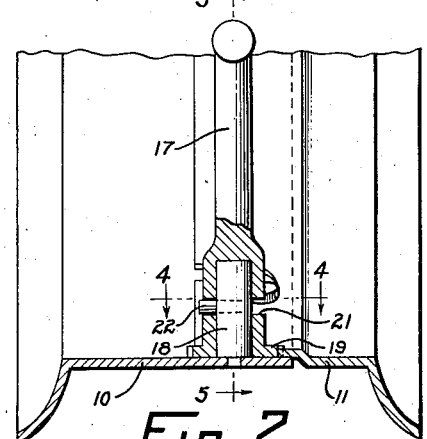
Figure 5:
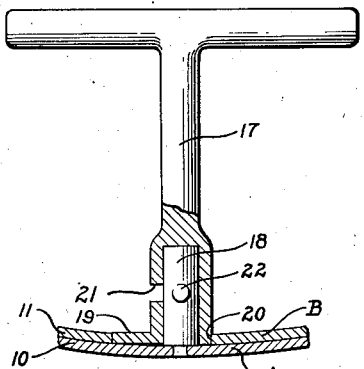
Fig. 5 is a detail view, partly in section and with parts broken away, the section being taken substantially on line 5—5 of Fig. 2.

In the assembly of members A and B on a tire, section A is first inserted into the tire casing from one side thereof and section B is inserted from the other side. Said sections are moved axially of each other into overlapping position until studs 14 reach the inner ends of the straight portions 15a of slots 15. The handle 17 is then rotated in a clockwise direction, as viewed in Fig. 4, and to the position shown in said figure, thereby moving member B circumferentially and axially into locked position, as shown more clearly in Fig. 2. The disassembly of the rim is accomplished by reversing the above operations and has been fully treated in the foregoing description.

There is thus provided a novel rim or supporting means for a tire which rim is strong and durable and whereby the tire may be mounted and demounted with utmost facility and without the necessity for using any tools whatsoever. The novel rim provided is so constructed as to insure the detachable parts thereof against separation during use and to render the attachment and detachment of the parts to and from one another very easy. Additionally, the rim of the present invention is entirely self contained, the means for moving the separable parts relative to each other and for securing the same in locked position forming an integral part thereof. Only a small number of comparatively rugged and simple parts are required in the manufacture of the rim hereby provided, thus rendering its manufacture easy and inexpensive.

Although only a single embodiment of the invention has been illustrated and described in detail, it is to be expressly understood that various changes may be made therein without departing from the spirit and scope of the invention. For example, post 18 may be made to be rotated by means of a detachable handle and have cam means 19 formed as a part thereof and movable therewith. More than one cam means may be provided, if desired. Other changes may also be made in the design and arrangement of parts illustrated, as will now be apparent to those skilled in the art. For a definition of the limits of the invention, reference is had primarily to the appended claims.

What is claimed is:

1. A rim comprising a plurality of annular members adapted to be moved axially into telescopic engagement, said members having pin and slot connections to secure the same together axially, and means for imparting relative circumferential movement to said members, said means comprising a rotatable cam mounted on one of said members and adapted to cooperate with a slot having curved walls in the other of said members.

2. A rim comprising a plurality of annular members adapted to be moved axially into overlapping position, said members having cooperating means for securing the same against relative axial movement, and means for imparting relative circumferential movement to said members, said last-named means comprising a cam having its axis of rotation fixed relative to one of said members and adapted to cooperate with a slotted portion of the other of said members.

3. A rim comprising a plurality of annular telescoping rim members having bayonet joint connections for securing the same against axial and circumferential movement relative to one another, and manually operable means cooperating with said connections for imparting relative axial and circumferential movement to said members, said last-named means including a rotatable cam member adapted to cooperate with a slot in one of said rim members.

4. A rim comprising a pair of telescoping members, means for holding said members against axial movement relative to each other, and means for imparting relative circumferential movement to said members, said last-named means comprising an eccentrically mounted circular member on one of said members adapted to cooperate with an arcuate wall of a slot in the other of said members.

5. A rim comprising a plurality of annular members adapted to be moved axially into overlapping position, means for moving said members circumferentially relative to each other, said means including a radially extending post secured to one of said members, a handle having a recess for receiving said post and cam means on the lower end of said handle and extending into a slot in the other of said members, and means for holding said members against axial movement relative to each other.

6. A rim comprising a plurality of annular members adapted to be moved axially into overlapping relation, means for moving said members circumferentially relative to each other, said means including a radially extending cylindrical post secured to one of said members, a handle having a counter-bored portion for receiving said post, a circumferential slot in said handle, means on said post extending into said slot to limit the angular movement of said handle and cam means on the lower end of said handle adapted to engage a slot in the other of said members, and pin and slot connections for securing said members together axially.

WILLIAM F. ERRIG.